Feb. 13, 1934.  G. A. STANTON  1,946,769
SPRING SUSPENSION FOR VEHICLES
Filed March 15, 1932
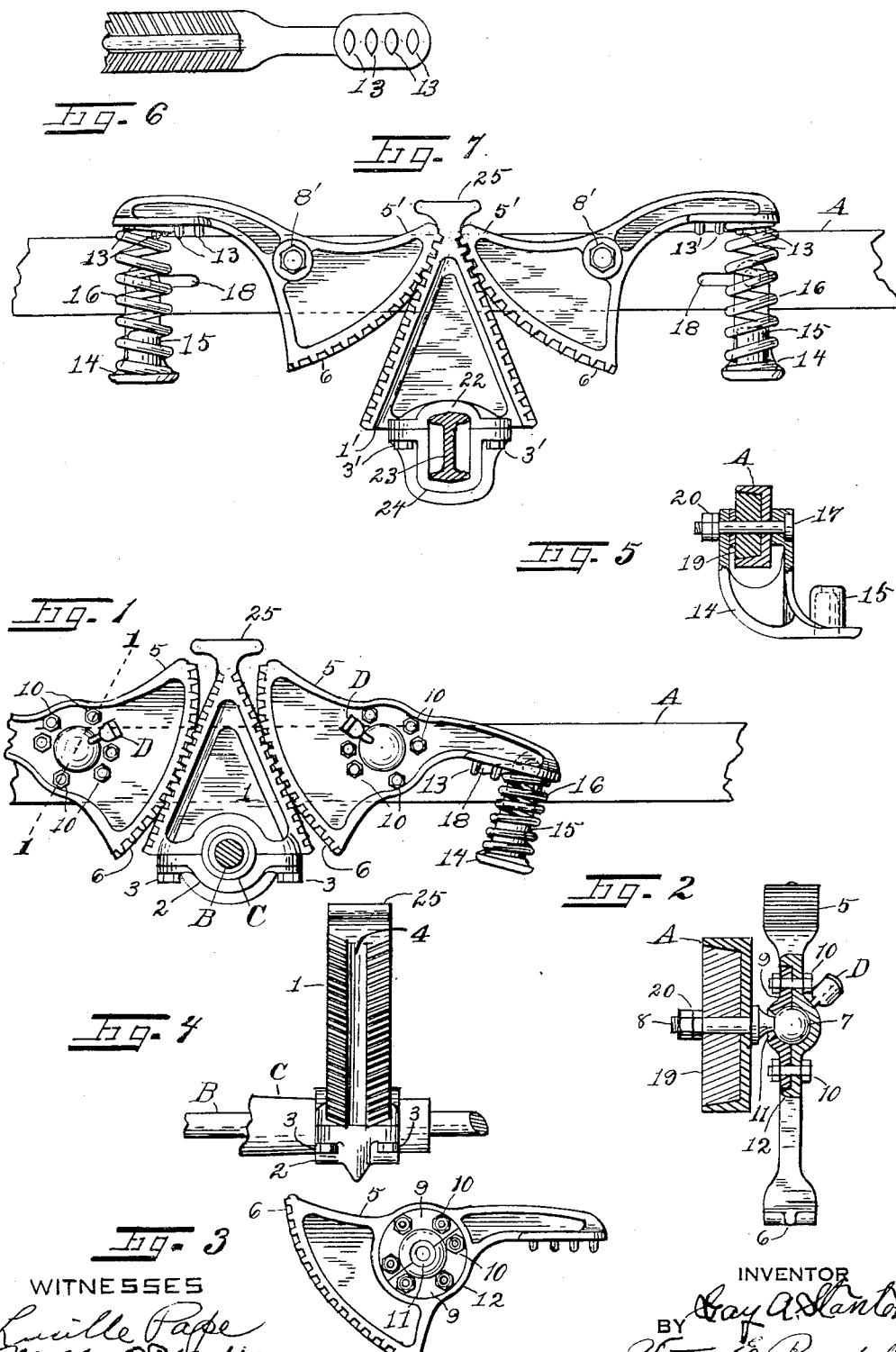

Patented Feb. 13, 1934

1,946,769

UNITED STATES PATENT OFFICE 1,946,769

SPRING SUSPENSION FOR VEHICLES

Gay A. Stanton, Battle Creek, Mich.

Application March 15, 1932. Serial No. 598,947

9 Claims. (Cl. 267—20)

The present invention more particularly, relates to spring suspensions for vehicles of the motor class, such as for instance, automobiles, busses and trucks.

Among other objects of the present invention, is to simplify and provide a suspension for vehicles in a greatly improved form over my U. S. Letters Patent, No. 1,259,797, granted Mar. 19, 1918.

Another object of the present invention, is to so devise the operative suspension, whereby a wheel in going over an obstruction at one side of a vehicle, or into a depression, said suspension will readily conform to the unevenness of the road, without binding of the parts, and at the same time, conserve better operation of the vehicle.

Still another object of the invention, is to so arrange the leverage of the rocker arms in connection with the springs, whereby as the load is increased, the springs may be so adjusted to readily compensate with the load, a feature of importance, especially when going over rough and uneven surfaces in minimizing the breakage of springs, and the tendency of a load to be jeopardized and misplaced.

Another advantage of the invention, is to so form the rocker arms in connection with the wedge-shaped members against which they rock, that as a load is increased, the leverage on the suspension springs will be lessened and minimize the tendency of the springs to be damaged or broken. These and other objects and advantages, will be readily apparent to those familiar with the construction and operation of motor-driven vehicles.

In the drawing forming a part of the specification:—

Fig. 1 represents my improved spring suspension for vehicles in broken section, as applied to the rear axle housing of a motor vehicle.

Fig. 2 is an enlarged detail cross section of the ball and socket joint of the spring operating geared rocker arm, in a plumb position, on the line 2, 2, of Fig. 1.

Fig. 3 is a reverse side view of a geared rocker arm, showing the split caps bolted into position, for holding the ball end of a supporting stud, the stud not being shown.

Fig. 4 is an edge view of an A-shaped wedge-shaped member, as rigidly attached to the housing of the rear axle of a motor vehicle.

Fig. 5 is a detail cross section of the chassis side frame and a pivotally suspended spring seat.

Fig. 6 is an under side of a rocker arm, showing the elliptical spring seating lugs, and Fig. 7, is a side view of the A-shaped wedge rigidly attached to an axle and the rocker arms pivotally supported on the side of a vehicle frame.

In the drawing, like marks of reference refer to corresponding or equivalent parts in the different views, in which:—A, represents the frame side of a motor chassis; B, a rear or live axle of a motor vehicle, and C, the axle housing.

Attached to the axle, or axle housing near the end, is an A-shaped wedge-shaped casting 1 with its base arched in the center to seat over the axle as shown, and below the axle, or axle housing a strap or box 2, conforming to the axle or axle housing, is secured to the wedge-shaped member, by bolts 3, or cap screws, to rigidly attach the parts together. Preferably the wedge-shaped member has a center groove 4, extending from the base to its apex on both sides, and geared teeth are disposed on each side of the groove in a diagonal manner.

Secured to the frame sides, both rearwardly and forwardly of the edges of the wedge-shaped member 1, geared rocker arms 5 are attached. These arms on their curved faces, each have a center rib 6, and diagonal cogs corresponding to the cogs on the wedge-shaped member into which the cogs of the rocker arms mesh, when in operative position. The ribs 6 of the arms are disposed to operate in the grooves 4, of the wedge member as a means, in cooperation with the meshing of the peculiar cogs of the parts, to prevent lateral displacement of the rocker arms from the wedge-shaped member. Another object of the diagonal formation of the cogs of the parts, is to readily permit sand, dirt, and other litter to slide or fall from parts, whereas with straight horizontal cogs intermeshing, should litter of any nature become lodged between the cogs, damage might occur.

Preferably the rocker arms 5 are supported on ball and socket mechanism. As shown in Fig. 2, the rocker arm has a hemispherical socket into which the ball end 7 of a shouldered stud 8 is seated. To secure the ball end of the studs in the cups of the arms, caps 9, 9 are bolted to the arm about the neck of the ball, by bolts 10. These caps have a clearance space 11 when placed about a stud to permit a rocker arm to have free play and keep in operative position with the wedge-shaped member 1, and should a vehicle tilt in going over an obstruction, or into a depression, it is evident that the peculiar hanging of the arms, taken in connection with the clearance about the studs, will readily permit working coperation of the spring suspension with the vehicle. As shown in Fig. 2, the rocker arm is bisected about the ball ended stud, looking from the rear portion thereof, as shown from the line 1, 1 of Fig. 1.

On the outside of the arms grease cups D are placed, with oil ducts leading to the ball ends of the studs, whereby said arms may be readily lubricated.

As shown in Figs. 2 and 3, the ball and socket caps 9, are seated on a flat surface of the arms and surrounded by an annular rib 12. This rib upon its inner surface, by preference, has a vertical wall, and taken in connection with the cap screws or bolts 10, prevents side thrust of the caps about the neck of the studs 8.

The rocker arms opposite their cam-shaped geared portions, have rearwardly extending ends with elongated round ended pads with elliptical sided lugs 13. These lugs are disposed in a center row on a pad and have spaces therebetween, whereby a spring many be changed from one position to another, and still retain said spring in an operative position, as will be more fully set forth hereinafter.

Near the outer ends of the rocker arms and suspended from the frame sides, are spring seating hangers 14. These hangers, as shown in Fig. 5, have double suspending sides and an outwardly spring seating base with a hollow center spring locating knob 15, about which a compression coil spring 16 is seated between the base and a pad at the outer end of an arm. The suspending sides of the hangers are pivotally supported from the frame by headed studs 17. These studs project through longitudinal slots 18, in the frame sides and through a filler 19 seating between the flanged angles of said frame, and are secured by lock nuts 20, screw threaded upon the inner portions of the studs.

As shown in the various views of the arms, the elliptic sided lugs 13, at the outer ends of said arms, taken in connection with the elongated slots 18, in the frame sides, permit the springs and their hangers on which they seat, to be moved to and from the rocker arm supporting studs, in accordance with a load to be carried.

As shown, the rocker arms 5 at their geared ends, are in the form of cams. The distance from their supporting studs, to the heels, or lower portions being shorter than from said studs to the tops or upper portions of the arms. This feature is for the purpose of lessening the stress on the springs, as a load is increased.

As shown in Fig. 1 the leverage between a stud and the heel of a rocker arm is shortened in proportion to the distance between the spring 16 and said stud, thereby relieving said springs from becoming overly stressed or broken, especially which might occur while operating a vehicle over rough and uneven roads, with a heavy and burdensome load.

As shown in Fig. 7, the rocker arms 5' are identically like the arms in the other views, with the exception, instead of being supported on ball and socket mechanism, the arms are suspended from and pivotally operable on studes 8' attached to the frame sides. In this view the wedge-shaped member 1' has a slotted bottom 22 adapted to seat and stride the axle 23, to which it is rigidly attached by a strap or under bearing 24 by bolts 3', in substantially the same manner as is the wedge 1, in the other views.

As shown, it is preferred to supply an outwardly projecting top 25, to the wedge-shaped member 1, for the purpose of preventing the came ended arms 5, from dislodgment when in operative position when assembled. As shown, this outwardly projecting top lies transverse to the axle.

In the various views herein illustrated, the spring suspension is shown attached to but one side of a vehicle, it is to be understood however, that both sides of a vehicle is to be equipped in a like manner.

In carrying out my invention, it is obvious that minor details of construction might be resorted to in accomplishing the same result as heretofore explained, and I reserve the right to so arranged and construct the parts as compatible with the intent and spirit of the appended claims.

Having set forth my invention, what therefore I claim and desire to secure by Letters Patent, is:

1. In a spring suspension for vehicles, the combination with a vehicle frame, its axle and a wedge-shaped member rigidly attached intermediate its base on the upper side of said axle, of ball ended studs extending from said frame one to the rear and one forward of said wedge-shaped member, opposing rocker arms having socket cups between their extremities suspended from said ball ended studs, said rocker arms having cam shaped ends adapted to cooperate with the inclined surfaces of said wedge-shaped member, and springs suspended from said frame near the outer ends of said arms and bearing upon the under surfaces of the outer ends of said arms whereby said frame will be free to oscillate, and means to prevent lateral displacement of said arms with said wedge-shaped member.

2. In a spring suspension for vehicles, the combination with a vehicle frame, its axle and a wedge-shaped member rigidly attached intermediate its base on the upper side of said axle, of ball ended studs extending from said frame both to the rear and forward of said wedge-shaped member, opposing rocker arms having socket cups between their extremities journalled on said ball ended studs, grease cups on said arms with ducts leading to the ball end of said studs, said wedge-shaped member having diagonally disposed wedge arranged cogs on its inclined surfaces, said rocker arms having cam shaped ends with cogs adapted to intermesh with the cogs of said wedge-shaped member, and springs supported from said frame near the outer ends of said arms, said springs adapted to bear upon the under sides of said rocker arms near the outer ends thereof whereby said frame may oscillate, and means to prevent lateral displacement of said rocker arms from said wedge-shaped member.

3. In a spring suspension for vehicles, the combination with a vehicle frame, its axle and a wedge-shaped member rigidly attached intermediate its base on the upper side of said axle, of ball ended studs extendingfrom said frame both to the rear and forward of the edge of said wedge-shaped member, opposing rocker arms having ball socket cups between their extremities journalled on said ball ended studs, grease cups on said rocker arms with ducts leading to the ball end of said studs, said rocker arms having cam shaped ends with diagonally disposed wedge arranged cogs, said wedge-shaped member having cogs on its inclined sides adapted to intermesh with the cogs of said rocker arms, compression coil spring hangers suspended from said frame near the outer ends of said rocker arms, compression coil springs seated in said spring hangers and bearing upon the under sides of the outer ends of said rocker arms whereby said frame may be free to oscillate, and means to prevent lateral displacement of said rocker arms from said wedge-shaped member.

4. In a spring suspension for vehicles, the combination with a vehicle frame, its axle and a wedge-shaped member rigidly attached intermediate its base on the upper side of said axle, of ball ended studs extending from said frame both to the rear and forward of the edge of said wedge-shaped member, opposing rocker arms having socket cups between their extremities journalled on said ball ended studs, said wedge-shaped member having diagonally disposed wedge arranged cogs on its inclined surfaces, said rocker arms having cam shaped ends with cogs adapted to intermesh with the cogs of said wedge-shaped member, adjustable coil spring hangers suspended near the outer ends of said rocker arms, compression coil springs seated in said hangers and bearing upon the under sides of said arms near their outer ends whereby said frame may be free to oscillate, and means in connection with said diagonal cogs to prevent lateral sway of said rocker arms on said wedge-shaped member.

5. In a spring suspension for vehicles, the combination with a vehicle frame, its axle and a wedge-shaped member rigidly attached intermediate its base on the upper side of said axle, of ball ended studs extending from said frame both to the rear and forward of the edges of said wedge-shaped member, opposing rocker arms having socket cups between their extremities journalled on said ball ended studs, said wedge-shaped member having diagonally disposed wedge arranged cogs on its inclined surfaces, said rocker arms having cam shaped ends with cogs adapted to intermesh with the cogs of said wedge-shaped member, said frame having slots below the outer ends of said rocker arms longitudinally therewith, adjustable spring hangers mounted in said slots whereby said hangers may be varied between the suspension of said rocker arms and their ends to vary the compression of springs seated in said hangers, and compression coil springs seated in said hanger between the under sides of said rocker arms near their outer ends whereby said frame may be oscillated, and means to prevent lateral sway of said rocker arms on said wedge-shaped member.

6. In a spring suspension for vehicles, the combination with a vehicle frame, its axle, and a wedge-shaped member rigidly attached intermediate its base on the upper side of said axle, of ball ended studs extending from said frame both to the rear and forward of the edges of said wedge-shaped member, opposing rocker arms having socket cups between their ends journalled on said ball ended studs, said wedge-shaped member having diagonally disposed wedge-arranged cogs on its inclined surfaces, said rocker arms having cam shaped ends with cogs adapted to intermesh with the cogs of said wedge-shaped member, adjustable oscillatory compression coil spring hangers suspended near the outer ends of said rocker arms on said frame, said rocker arms having depending elliptic sided longitudinally disposed lugs on the under sides of said arms near their outer ends, compression coil springs seated in said hangers and bearing upon the outer under sides of said arms between said lugs whereby said springs may be adjusted together with said hangers and between said lugs to compensate with a load carried on said frame, and whereby said frame may be free to oscillate, and means in connection with said diagonally disposed cogs to prevent lateral displacement of said rocker arms with said wedge-shaped member.

7. In a spring suspension for vehicles, the combination with the frame of a vehicle, its axle and a wedge-shaped member rigidly attached intermediate its base on the upper side of said axle, of ball ended studs extending from said frame both to the rear and forward of the edges of said wedge-shaped member, opposing rocker arms having socket cups between their ends journalled on said ball ended studs, said wedge-shaped member having diagonally disposed wedge-disposed cogs on its inclined surfaces, said rocker arms having cam shaped ends with cogs adapted to intermesh with the cogs of wedge-shaped member, the cam ends of said rocker arms varying in their operation with said wedge-shaped member and diminishing the leverage at the outer ends of said rocker arms as a load is increased on said frame, adjustable oscillatory compression coil spring hangers suspended from said frame near the outer ends of said rocker arms, compression coil springs seated in said hangers and bearing upon the under sides of the outer ends of said rocker arms, means to retentively hold said springs to said arms in their adjustment with said hangers whereby said frame may be free to oscillate, and means to prevent lateral displacement of said rocker arms with said wedge-shaped member.

8. In a spring suspension for a vehicle, the combination with a vehicle frame, its axle, a wedge-shaped member having a groove intermediate its inclined edges and secured to said axle intermediate its base, and rocker arms oscillatory journalled to the sides of said frame, said arms having curved faces operative on the inclined faces of said wedge-shaped member and ribs intermediate the edges of said curved faces adapted to operate in the grooves of said wedge-shaped member, of said rocker arms having diagonally disposed wedge-shaped arranged cogs on both sides of said ribs adapted to intermesh with corresponding cogs of said wedge-shaped member, spring suspensions attached to said frame near the outer ends of said oscillatory arms, compression coil springs seated in said spring suspensions and bearing upon the under sides of said oscillatory arms, whereby said frame may be free to oscillate, said diagonally disposed cogs and said ribs operating in said grooves preventing said oscillatory arms from lateral displacement with said wedge-shaped member.

9. In a spring suspension for vehicles, the combination with a vehicle frame, its axle and a wedge-shaped member rigidly attached intermediate its base on the upper side of said axle of ball ended studs extending from said frame, one to the rear and one forward of said wedge-shaped member, opposing rocker arms having socket cups between their exteremities suspended from said ball ended studs, said rocker arms having cam shaped ends adapted to cooperate with the inclined surfaces of said wedge-shaped member, said member having oppositely disposed overhanging portions extending transversely of the axle at the upper end of said wedge-shaped member for the purpose of preventing said cam shaped members from disengagement from said wedge-shaped members, and springs suspended from said frame near the outer ends of said arms and bearing upon the outer ends of said arms whereby said frame will be free to oscillate, and means to prevent lateral displacement of said arms with said wedge-shaped member.

GAY A. STANTON.